United States Patent Office 3,344,120
Patented Sept. 26, 1967

3,344,120
TRIOXANE-NORBORNADIENE COPOLYMERS
Irving Rosen, Painesville, Ohio, assignor to Diamond Alkali Company, Cleveland, Ohio, a corporation of Delaware
No Drawing. Filed Apr. 19, 1965, Ser. No. 449,271
13 Claims. (Cl. 260—73)

ABSTRACT OF THE DISCLOSURE

The thermally stable oxymethylene copolymers contain from about 90 to 99.9 mol precent of recurring oxymethylene units and from 0.1 to 10 mol percent of (cyclic) units derived from a norbornadiene monomer selected from unsubstituted norboradiene or norbornadienes having only one lower alkyl group attached to the norbornadiene ring. Copolymers exhibit a reaction rate constant for thermal degradation at 240° C. of 0.6 weight percent per minute, or less. They are prepared either in bulk or in an inert organic liquid reaction medium by contacting trioxane and the described norbornadiene monomer with a cationic catalyst which is a metal halide or a coordinate complex thereof with an organic oxygen, sulfur or nitrogen-containing compound.

---

This application is a continuation-in-part of my co-pending application. Ser. No. 346,099, filed Feb. 20, 1964.

This invention relates to novel, thermoplastic compositions of matter. More particularly, it relates to copolymers structurally related to polyoxymethylene having a high degree of thermal stability.

Oxymethylene polymers have become, in recent years, well known in the art. They may be prepared by polymerizing under substantially anhydrous conditions either formaldehyde or trioxane which is a cyclic trimer of formaldehyde, or by polymerizing other oligomers of formaldehyde. Oxymethylene polymers are thermoplastic materials of varying molecular weight, composed of repeating oxymethylene —CH$_2$O— units joined together in linear chains which may be terminated at one or at both ends by thermally unstable hydroxyl groups, depending upon the method of preparation. These polymers will be degraded or decomposed in varying degrees when exposed to elevated processing temperatures. To minimize degradation, these materials, prior to being processed, are usually further treated such as by chain end-group "capping," i.e., by converting the unstable hydroxyl groups to more stable ester or ether groups, and/or by incorporating therewith stabilizing additives which will also inhibit thermal degradation of the polymer to some degree.

It is an object of this invention, therefore, to provide a polymeric composition which is structurally related to polyoxymethylene but, unlike polyoxymethylene, exhibits, as prepared, a high degree of thermal stability.

It is another object to provide a composition having a high degree of thermal stability which suitably may be employed to prepare tough and durable plastic articles such as films, moldings, extrusions and the like.

It is still another object to provide tough and durable thermoplastic articles such as described above from an oxymethylene copolymer composition having a high degree of thermal stability.

These and other objects of this invention are accomplished by copolymerizing, in an inert atmosphere, under substantially anhydrous conditions and in the presence of a cationically-active polymerization catalyst or initiator, trioxane and a norbornadiene monomer which may be represented by the following planar structural formula:

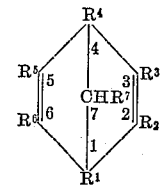

I wherein R$^1$ to R$^7$ are each selected from the group consisting of hydrogen and lower alkyl radicals containing up to 4 carbon atoms, with no more than one R being an alkyl radical.

The term "norbornadiene monomer" as used herein in the specification and claims and as represented by the structural formula above, is intended to refer to unsubstituted norbornadiene and to norbornadienes having only one lower alkyl group attached to the norbornadiene ring. Substituted norbornadienes especially suitable for use are those substituted in the 2- and 4-positions of the norbornadiene ring e.g., 2-methyl norbornadiene, 4-methyl norbornadiene and the like. However, because of its ready availability, unsubstituted norbornadiene monomer is at present preferred for use in the present invention. For this reason, specific references will be made hereinafter to this monomer. Such references are not to be taken, however, as limiting the present invention but merely as being illustrative thereof.

More specifically, the present invention involves the preparation of useful, easily workable oxymethylene copolymer compositions by polymerizing, under conditions as stated above, a monomeric mixture containing from 90 up to 99.9 mol percent of trioxane in combination with from 0.10 up to 10 mol percent of norbornadiene monomer as defined above, said process being conducted at a temperature within the range of 30° C. to 100° C.

The copolymer products obtained are solid, medium to high molecular weight materials which exhibit inherently a high degree of thermal stability, being not subject to substantial weight reduction, i.e., decomposition or degradation, when exposed to temperatures of at least 200° C. or above, contrary to the significant or complete decomposition evidenced by unstabilized polyoxymethylenes prepared by similar processes and tested at these same temperatures. Thus, it is possible to fabricate these copolymers at the elevated processing temperatures required without first stabilizing them against thermal degradation as, for example, by "capping" of their end-groups, or by incorporating stabilizing additives therewith.

As designated herein, the thermal stability of the copolymers of this invention is the value representing the constant rate at which these copolymers degrade or decompose at an elevated temperature at which degradation can be easily and accurately measured. This value, i.e., reaction rate constant for thermal degradation, is measured herein by well known thermogravimetric analytical techniques, using a Stanton Automatic Recording Thermobalance, High Temperature Model. Throughout the test, the copolymer is maintained at a temperature of 240° C., the decomposition of the copolymer as measured by loss in weight and the time of the test in minutes being automatically recorded. After the heat treatment, the decomposition rate of the copolymer is obtained by plotting, as the ordinate, the logarithm of the weight percent of the remaining undegraded copolymer versus the corresponding time of oven exposure. A curve drawn through the plotted values indicates that, after rather rapid degradation initially, the copolymer degrades at a much slower even rate throughout the major portion of the degradation period, which slower rate characterizes the stable nature of the copolymer. Accordingly, the reaction rate constant for thermal degradation of the copolymers of this invention is selected from this latter portion of the degradation curve and is expressed as weight percent per minute. The copolymers of this invention exhibit generally a reaction rate constant for the thermal degradation at 240° C. of 0.6 weight percent per minute, or less, with the preferred copolymers exhibiting reaction rate constants of 0.4 weight percent per minute, or less.

While we do not wish to be bound by any definite theory with regard to the manner in which copolymerization is accomplished, it is believed that the norbornadiene comonomer is incorporated into the growing copolymer chain primarily through carbon atoms in the 3- and 5-positions of the norbornadiene monomer molecule (Structure I above). Concomitant with this addition reaction, the norbornadiene ring structure is rearranged to a nortricyclene configuration through formation of a bond between carbons in the 2- and 6-positions of the norbornadiene ring system. Thus, the resulting copolymer chain may contain interspersed between recurring oxymethylene groups recurring nortricyclene units having the following structure:

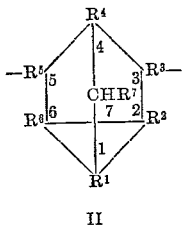

II wherein $R^1$ to $R^7$ are each selected from the group consisting of hydrogen and lower alkyl radicals having up to 4 carbon atoms, with no more than one R being an alkyl radical. It should be noted that copolymerization most likely proceeds substantially in this manner as indicated by the presence of characteristic nortricyclene and cyclopropane absorption bands in infrared spectra of the copolymer products obtained.

However, copolymerization may also be effected through carbon atoms in, for example, the 2- and 3-positions only of the norbornadiene ring so that the resulting copolymer chain contains recurring norbornene groups or units having the following representative structure:

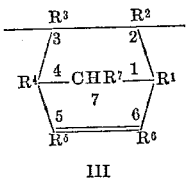

III wherein $R^1$ to $R^7$ are each selected from the group consisting of hydrogen and lower alkyl radicals having up to 4 carbon atoms with no more than one R being an alkyl radical.

It is likewise possible that in the reaction the norbornadiene comonomer may be incorporated both as nortricyclene and norbornene units, in which case the resulting copolymer chain will contain recurring oxymethylene groups interspersed with units having structures as described above (II and III).

In the copolymer products, the nortricyclene units and/or norbornene units may be interspersed singly between oxymethylene units in the copolymer chain and may also be present therein as comonomer blocks, i.e., segments of the chain comprising more than one of the said units sequentially joined together with no oxymethylene unit between them.

It should be understood that in addition to the reactions described hereinabove, it is also possible that the norbornadiene comonomer may be incorporated into the growing copolymer chain, for example, by addition through both double bonds of the norbornadiene molecule, or by an opening of at least one of the norbornadiene rings.

The copolymer products of this invention may contain generally from about 0.10 up to 10 mol percent or norbornadiene. Thus, in the copolymeric chain there will be from about 90 up to 99.9 mol percent of oxymethylene recurring units and from about 0.10 up to 10 mol percent of recurring units derived from the norbornadiene comonomer. The preferred copolymers contain from about 0.3 up to 5 mol percent of the said recurring units derived from norbornadiene and from about 95 up to 99.7 mol percent of recurring oxymethylene units.

The composition of the copolymers, as described above, is determined herein by elemental carbon and hydrogen analysis. The percentage of these elements is higher in the copolymers than in an oxymethylene homopolymer prepared under similar conditions. Therefore, employing the different carbon and hydrogen analyses obtained for the copolymer and for the homopolymer and by a series of calculations, the number of units derived from the norbornadiene monomer recurring in the copolymer chain, i.e., the mol percentage of norbornadiene in the copolymer, is obtained.

Infrared analysis is also employed herein to characterize the chemical structure of the copolymers of this invention, particularly with regard to the presence of nortricyclene units therein. Techniques used to analyze materials by infrared spectroscopy are familiar to those skilled in the art and, as applied herein, were accomplished employing a Perkin-Elmer Spectrophotometer, Model 21, fitted with a sodium chloride prism and operated under standard conditions. Thin films prepared from the copolymers were used as sample specimens. All analyses were made in the wavelength region of 2 to 15.0 microns ($\mu$). As found in reference spectra, an absorption band characteristic for the nortricyclene structure appears in the region of 12.0 to 12.5$\mu$. An absorption band which is due to carbon-hydrogen stretching vibrations characteristic of the cyclopropane ring in the nortricyclene structure appears in the region of 3.24 to 3.28$\mu$. Absorption bands in these regions are evident in the spectrum of each of the copolymers tested, indicating that the nortricyclene structure is present in these copolymers.

Depending upon the percentage of norbornadiene monomer present in the copolymer products, these materials have melting points somewhat lower than, or approximately the same as, oxymethylene homopolymers, i.e., these copolymers have melting points within the range of about 150° to 180° C. or above. In appearance, the copolymers resemble polyoxymethylene and those having similar melting points likewise exhibit similar properties.

The copolymer products of this invention have average polymer molecular weights ranging from 6000 to 90,000. In order to produce finished plastic articles having useful property levels, these copolymers usually will have an inherent viscosity of at least 0.7, which value is determined by measuring, at 60° C., the viscosity of a 0.5 percent solution of the copolymer in p-chlorophenol (containing 2 percent of a-pinene, by weight). An inherent viscosity of 0.7 corresponds to an average polymer molecular weight of approximately 10,000. Copolymers from which products having the most useful property levels are prepared have usually an inherent viscosity of at least 1.0, which value corresponds to an average polymer molecular weight of about 18,000.

The copolymerization reaction is effected in the presence of a cationically-active polymerization catalyst. Suitable compounds of this type include Lewis acids, e.g., metal halides such as the halides of aluminum, boron, tin, titanium, zirconium, strontium, niobium and the like, and coordinate complexes of such metal halides with organic compounds where oxygen, nitrogen or sulfur is the donor atom. In practice, the coordinate complexes of metal halides with organic compounds are most suitably employed with the coordinate complexes of boron trifluoride being especially preferred. Such boron trifluoride complexes may be, for example, a complex of boron trifluoride with an alcohol, a phenol, an acid, an ether, an acid anhydride, an ester, a ketone, an aldehyde, a dialkyl sulfide, a mercaptan and the like. Of these types, the boron trifluoride complexes with ethers such as diethyl ether, dibutyl ether and the like are especially preferred. Fluoroborate aryl diazonium salts, such as phenyl diazonium fluoroborate are also preferred for use. In general, the particular catalyst employed in the process of this invention may be used in amounts ranging from $5 \times 10^{-5}$ to $1 \times 10^{-2}$ mols per mole of trioxane, i.e., from about 0.05 to about 10 millimols for each mol of trioxane employed. It is to be noted that under similar polymerization conditions, the particular catalyst concentration employed as well as, for example, the norbornadiene level in the reaction mixture affects the induction period in the reaction. As used herein, the induction period refers to that portion of the reaction time which elapses after catalyst introduction before solid copolymer formation is observed. Thus, the induction period of the reaction may vary widely depending upon the monomer/catalyst ratio employed. In practice, it has been found that copolymer products may be obtained in good yield at comparatively fast, economically feasible reaction rates by employing an amount of catalyst within the range of about 0.1 to about 3 millimols per mol of trioxane, which catalyst range is preferred.

The copolymer products of this invention may be conveniently prepared in good yield (60% to 90% conversion) by contacting the trioxane and norbornadiene monomer in the fluid state with the catalyst essentially in the absence of a solvent or other liquid reaction medium. Alternatively, polymerization may be conducted in an anhydrous organic liquid which is solvent for the trioxane and the norbornadiene. Solvents preferably employed are aliphatic and cycloaliphatic hydrocarbons, e.g., hexane, cyclohexane, heptane and the like. In most instances, the polymer product formed is essentially insoluble in the solvent used in the reaction and may be recovered easily therefrom by filtration. The solvent is employed generally in a ratio of about 0.1 to 5 mols for each mol of trioxane. However, a concentration of 0.1 to 1 mol of solvent for each mol of trioxane has usually been found satisfactory and is preferred.

The copolymerization reaction, whether conducted in bulk or in a solvent medium as described above, generally is carried out at temperatures within the range of 30° to 100° C. and for a time period of from 0.5 hours to 20 hours, depending upon the catalyst concentration in the reaction mixture. However, reaction temperatures within the range of 30° to 70° C. and reaction times of 1 to 5 hours are typically employed within the preferred catalyst range.

It has been found that trace contaminants such as moisture present in the reaction mixture or introduced therein by contact with atmospheric air substantially inhibit monomer conversion to the desired copolymers in good practical yields. Therefore, it is essential that the copolymerization process be conducted under anhydrous, or substantially anhydrous, conditions in an inert atmosphere. For most satisfactory copolymer products, it has been established that the reaction ingredients, i.e., the monomers, or the monomers and solvent in combination, should contain no more than 100 p.p.m., preferably no more than 50 p.p.m. of water. Likewise, impurities in the monomers should be removed as completely as possible. In practice, the catalyst employed is prepared and then kept prior to use in a nitrogen atmosphere. The monomeric materials are advantageously dried prior to copolymerization by careful distillation over a dehydrating agent such as sodium and by passage of the monomer vapors formed through an absorbent such as molecular sieves, silica gel, etc. When employed, the liquid reaction medium may be dehydrated by standard distillation and drying methods.

The copolymerization reaction may be conducted in a conventional reactor such as a jacketed flask or glass-lined polymerization kettle fitted with a stirring apparatus preferably adapted for high-speed agitation. Alternatively, it may be carried out in a high-shear mixer such as used heretofore in polymerization processes for various monomers. High-shear mixers which suitably may be employed as reactors herein include, for example, the "Sigma Mixer" such as manufactured by the Read Corporation; the "Ko-Kneader" described in U.S. Patent 2,505,125 and a Banbury mixer.

Upon completion of the reaction, the copolymer product mass is isolated from the reaction mixtures and is ground to particulate form. Before being dried, the resulting particulate copolymer product is usually purified by leaching it well with acetone, with hot water and again with acetone, to remove any unreacted monomer and lower molecular weight homopolymers remaining. Additionally, the copolymer product may be heated briefly at a temperature of 100° to 160° C. to decompose any loose unstable chain ends.

As shown hereinafter by specific examples, the copolymers of this invention possess inherently a high degree of thermal stability as evidenced by their insignificant weight loss, i.e., decomposition when tested for thermal degradation as described. The excellent stability exhibited by these products is in marked contrast to that of unstabilized polyoxymethylenes prepared by similar processes which materials decompose rapidly when subjected to these same temperatures. Thus, it is possible to process the copolymers of this invention as prepared without any further stabilizing treatment such as by chain end-group "capping" and/or by incorporating stabilizing additives therewith. However, it is to be understood that these copolymers may be so treated, if desired, without departing from the intended scope of this invention.

The copolymer products of this invention may be used to prepare articles such as moldings, films, sheets, rods, tubes, fibers, filaments and the like by conventional molding, casting and/or extrusion processes such as are practiced at the present time. The finished articles exhibit generally excellent physical and chemical properties typical of articles fabricated from oxymethylene homopolymers. In processing, the copolymer products of this invention may be used unmodified or, if desired, may have incorporated therewith additives such as anti-oxidants, fillers, pigments, stabilizers, processing aids and the like which are oftentimes employed when processing such thermoplastic materials.

In order that those skilled in the art may more completely understand the present invention and the preferred methods by which the same may be carried into effect, the following specific examples are offered.

*Example 1*

A 100-milliliter, round-bottom flask equipped with an agitator, a rubber serum cap for injection of ingredients and with nitrogen inlet and outlet tubes is positioned in an oil bath heated to 58° C. and is flushed with nitrogen. Forty-nine and three-tenths g. (0.547 mol) of trioxane, 15 g. (0.179 mol) of cyclohexane, 1.5 g. (0.016 mol) of norbornadiene and 0.194 g. (0.97 millimol) of boron trifluoride dibutyl etherate are then charged to the flask with agitation. The combined water content of the trioxane, cyclohexane and norbornadiene is 50 p.p.m. The reaction mixture is maintained at 58° C. under a slight positive nitrogen pressure for 5 hours, after which the mixture is cooled and discharged from the flask. The polymeric solids are separated from the liquid medium, and ground in a Waring Blendor containing acetone. The pulverulent product obtained is then successively washed with acetone, hot water and acetone to remove residual monomer, solvent and any low molecular weight homopolymers.

Finally the treated product is dried under vacuum at 50° C. There is recovered 41.0 g. of a very fine, white polymeric material. This product contains 1.1 mol percent of norbornadiene, as determined by elemental chemical analysis. The copolymer has an inherent viscosity of 1.64, a melting point of about 176° C. and shows stability up to at least 250° C. The presence of nortricyclene units in the copolymer, as hereinbefore described, is shown by infrared analysis. The product of this example has a reaction rate constant for thermal degradation at 240° C. of 0.05 weight percent per minute, 92 percent of the copolymer remaining stable after the initial decomposition is completed. A portion of the copolymer is molded for 1 minute at a temperature of 180° C. under a pressure of 2000 p.s.i. to prepare an extremely tough, white, opaque specimen molding which shows no evidence of thermal degradation.

Example 2

Following the general procedure and using the same proportion of ingredients as outlined in Example 1, a copolymer is prepared. The norbornadiene employed in this example is further purified by treatment with silica gel. The reaction is carried out at a bath temperature of 60° C. for 1⅓ hours. Forty-three and six-tenths g. of a fine, white product (86.3% conversion) is recovered, which is found by elemental analysis to contain 0.7 mol percent of norbornadiene. This product has an inherent viscosity of 1.12, a melting point of approximately 170° C. and shows substantial stability up to at least 250° C. Infrared analysis indicates the nortricyclene structure present in the copolymer. This product has a reaction rate constant for thermal degradation at 240° C. of 0.29 weight percent per minute, 85 percent of the polymer remaining stable after the initial decomposition is completed. When molded under conditions as described in Example 1, the copolymer product of this example produces tough, white specimen moldings exhibiting no thermal degradation.

Example 3

To illustrate the improved thermal stability of the copolymer products of this invention by comparison to that of oxymethylene homopolymers, a homopolymer is prepared following the general procedure as outlined in Example 1, employing 35.2 g. (0.391 mol) of trioxane, 24.8 g. (0.282 mol) of cyclohexane and 0.092 g. (0.46 millimol) of boron trifluoride dibutyl etherate. The polymer recovered which has an inherent viscosity of 1.1, melts sharply at 177° C. When tested for thermal stability by thermogravimetric analysis this polymer exhibits a reaction rate constant for thermal degradation at 220° C. ($k_{220}$) of 4.83 weight percent per minute during the first 30 minutes of the test period, and thereafter degrades at 1.5 percent per minute. The polymer sample completely decomposes and disappears about 60 minutes after the test has started. The homopolymer thus shows significantly poor stability by comparison to the copolymer products of the previous examples which exhibit a reaction rate constant for thermal degradation of significantly less than 0.5 weight percent per minute. When the homopolymer is molded under conditions as outlined in the previous examples, badly distorted dull pieces of opaque material are obtained. These pieces are brittle and appear somewhat porous in nature, as if partially foamed by gaseous formaldehyde monomer evolved by decomposition of the polymer during heating.

Example 4

The copolymerization process as outlined in Example 1 is repeated, using 1.07 millimols of catalyst instead of the 0.97 millimol catalyst employed in Example 1. The combined water content of the reaction ingredients is 85 p.p.m. The reaction is conducted at a bath temperature of 59° C. for 4½ hours, after which the product precipitate is isolated, purified and dried as previously described. The copolymer product, which is recovered in 54.3 percent yield, contains 0.8 mol percent of norbornadiene, has an inherent viscosity of 1.03 and a melting point of approximately 168° C. The polymer product of this example has a reaction rate constant for thermal degradation at 240° C. of 0.17 weight percent per minute. White, opaque specimen moldings prepared from the copolymer product are similar in appearance and properties to the molded products of the previous examples.

Example 5

A copolymer product is prepared as described in the previous examples, but in the absence of an organic liquid reaction medium. Using 35.2 g. (0.391 mol) of trioxane, 1.07 g. (0.023 mol) of norbornadiene and 0.092 g. (0.46 millimol) of boron trifluoride dibutyl etherate, the reaction is conducted for 1 hour at a bath temperature of 100° to 103° C. The copolymer product which is obtained in 74.9 percent yield contains 0.5 mol percent of norbornadiene, as determined by elemental chemical analysis. It has a melting point of 170° C. and a reaction rate constant for thermal degradation at 240° C. of 0.56 weight percent per minute. This copolymer has an average polymer molecular weight of approximately 10,000.

Example 6

A copolymer is prepared following the general procedure as outlined in Example 1, employing 35.2 g. (0.391 mol) of trioxane, 24.8 g. (0.282 mol) of cyclohexane, 0.27 g. (0.003 mol) of norbornadiene and 0.092 g. (0.46 millimol) of boron trifluoride dibutyl etherate. The reaction mixture is maintained at a bath temperature of 70° to 74° C. for 21 hours, after which the product is recovered as described previously. The copolymer obtained (in 80.3 percent yield) contains 0.25 mol percent of norbornadiene. It has an inherent viscosity of 1.26 and a melting point of approximately 175° C. This copolymer has a reaction rate constant for thermal degradation at 240° C. of 0.32 weight percent per minute. When molded as described previously, the specimen moldings obtained from the copolymer show a high degree of thermal stability.

Example 7

A jacketed Sigma Mixer of one-quart capacity is cleaned and heated to 60° C. It is then sealed and flushed with nitrogen. While continuing to maintain a slight positive nitrogen pressure on the system, 216 ml. of anhydrous cyclohexane, 20.4 ml. of purified norbornadiene and 504 ml. of molten trioxane are charged to the mixer with agitation. After these ingredients are thoroughly blended together, 12 ml. of a 1-molar solution of boron trifluoride dibutyl etherate in cyclohexane (2.51 millimols catalyst per mol of trioxane) is injected into the reactor. The reaction mixture has an induction period of 30 minutes after catalyst addition. The reaction is then continued for an additional 75 minutes, during which time period the reaction mixture is maintained at a temperature of 60° to 65° C. The mixer is then shut down, the solid copolymer product is isolated and ground under methanol to particulate form. The granular product obtained is washed well with acetone and is finally dried at 60° C. under vacuum. The finished copolymer has an inherent viscosity of 0.98 and a reaction rate constant for thermal degradation at 220° C. of 0.09 weight percent per minute.

It is to be understood that although the invention has been described with specific reference to particular embodiments thereof, it is not to be so limited, since changes and alterations therein may be made which are within the full intended scope of this invention as defined by the appended claims.

What is claimed is:
1. A normally solid thermoplastic copolymer having a high degree of thermal stability comprising essentially from about 90 up to 99.9 percent of recurring oxymethylene units and from about 0.1 up to 10 percent of recurring units derived from a norbornadiene monomer, said units having at least one structure selected from the group consisting of

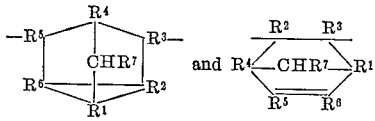

wherein $R^1$ to $R^7$ are each selected from the group consisting of hydrogen and lower alkyl radicals having up to 4 carbon atoms, with no more than one R being an alkyl radical.

2. The copolymer composition of claim 1 which has an inherent viscosity of at least 0.7 and a reaction rate constant for thermal degradation at 240° C. of no more than 0.6 weight percent per minute.

3. The copolymer composition of claim 1 which contains from about 95 to 99.7 percent of recurring oxymethylene units and from about 0.3 up to 5 percent of recurring units derived from norbornadiene, the said copolymer composition having a reaction rate constant for thermal degradation at 240° C. of no more than 0.4 weight percent per minute.

4. The copolymer of claim 1 which comprises 90 to 99.9% of recurring units derived from trioxane and 0.1 to 10% of cyclic units derived from norbornadiene.

5. The copolymer of claim 1 which comprises 90 to 99.9% of recurring units derived from trioxane and 0.1 to 10% of cyclic units derived from 2-methyl norbornadiene.

6. A process for preparing a copolymer composition having a high degree of thermal stability which comprises reacting in an inert atmosphere under substantially anhydrous conditions at a temperature in the range of about 30° to 100° C. for a time period of from 30 minutes to 20 hours and in the presence of from 0.05 to about 10 millimols per mol of trioxane of a polymerization catalyst selected from the group consisting of halides of aluminum, boron, tin, titanium, zirconium, strontium, and niobium and coordinate complexes of such metal halides with organic compounds where oxygen, nitrogen, or sulfur is the donor atom, a mixture comprising, as the major constituent, trioxane and as the minor constituent, a norbornadiene monomer having the structure

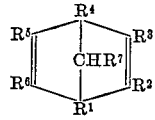

wherein $R^1$ to $R^7$ are each selected from the group consisting of hydrogen and lower alkyl radicals having up to 4 carbon atoms with no more than one R being an alkyl radical; and recovering a solid copolymer containing from about 90 up to 99.9 percent of recurring oxymethylene units and from about 0.1 up to 10 mol percent of recurring units derived from the said norbornadiene monomer.

7. The process of claim 6 in which the catalyst is a boron trifluoride coordinate complex with an organic compound in which oxygen is the donor atom.

8. A process for preparing a copolymer composition having a high degree of thermal stability which comprises reacting, under substantially anhydrous conditions, at a temperature ranging from 30° to 100° C. and for a time period of from 30 minutes to 20 hours, a major amount of trioxane and a minor amount of norbornadiene in the presence of between 0.05 to about 10 millimols per mol of trioxane, of a polymerization catalyst selected from the group consisting of halides of aluminum, boron, tin, titanium, zirconium, strontium, and niobium coordinate complexes of metal halides with organic compounds in which the donor atom is selected from the group consisting of oxygen, nitrogen and sulfur; and recovering a solid copolymer containing from about 90 up to 99.9 percent of recurring oxymethylene units and from about 0.1 up to about 10 percent of recurring units derived from norbornadiene, the said copolymer composition having an average molecular weight of at least 6000.

9. The process of claim 8 in which the reaction is conducted at a temperature ranging from 30° to 70° C. for a time period of 1 to 5 hours.

10. The process of claim 8 in which the catalyst is a boron trifluoride coordinate complex with an organic compound in which oxygen is the donor atom.

11. The process of claim 8 in which the catalyst is employed in an amount ranging between 0.10 to 3 millimols per mol of trioxane.

12. The process of claim 8 which is conducted in an inert, substantially anhydrous organic liquid reaction medium.

13. The process of claim 12 in which the organic liquid reaction medium is an aliphatic hydrocarbon.

References Cited

UNITED STATES PATENTS

| 3,066,123 | 11/1962 | Strohmayer et al. | 260—93.1 |
| 3,252,957 | 5/1966 | Pledger | 260—93.1 |
| 3,254,053 | 5/1966 | Fisher et al. | 260—67 |

FOREIGN PATENTS

| 863,373 | 3/1961 | Great Britain. |

OTHER REFERENCES

Kern et al.: Angewandte Chemie, vol. 73(b) (March 1961), pp. 177–186.

Furukawa et al.: Polymerization of Aldehydes and Oxides, N.Y. Interscience, 1963, pp. 401–402.

WILLIAM H. SHORT, *Primary Examiner.*

L. M. PHYNES, *Assistant Examiner.*